Patented Aug. 9, 1938

2,126,277

UNITED STATES PATENT OFFICE 2,126,277

PRODUCTION OF ORGANIC DEODORIZED SOLVENTS

Francis Norman Pickett, London, England, assignor to United States Rubber Products, Inc., New York, N. Y., a corporation of Delaware No Drawing. Application October 24, 1935, Serial No. 46,529. In Great Britain September 20, 1934

3 Claims. (Cl. 134—17)

This invention relates to the art of preparing solvents of organic origin, and has for its object to provide an improved method of preparing and deodorizing solvents of this nature.

It is particularly applicable to solvents manufactured from rubber whether in the form of latex, crude rubber, or vulcanized rubber.

Solvents have been previously prepared by the destructive distillation of rubber, and these solvents possess valuable properties, but in the presence of certain reagents such as hydrochloric acid, they have been found to be unstable, and also have the disadvantages of possessing a strong odour and a dark colour.

By fractional distillation of the said distillate of rubber, it is possible to produce a light solvent which may be subsequently deodorized and decolourized, but the residue after such fractional distillation is only useful as a fuel oil or in connection with the reclaiming of vulcanized rubber.

With my invention it is possible to produce a light solvent of water-white colour which is free from objectionable odour and also a heavier fraction consisting of a viscous oil suitable for use as a lubricant. Both the light solvent and the lubricant are stable in the presence of hydrochloric acid and oxidizing agents.

In carrying my invention into effect from rubber latex I first evaporate the water or serum leaving only the rubber. To this rubber I add 5 to 10% of anhydrous aluminium chloride and distil.

The distillation may take place with a reflux condenser for from 20 to 30 hours with subsequent fractional distillation, or preferably I may so adjust the rate of distillation that about 3.3% of the total weight of the rubber is passed over into a separate condenser as distillate per hour. In other words, it has been found that if the light fractions are removed as rapidly as they are formed by distillation at atmospheric pressure or slightly above, then the rate of formation of these light fractions is greatly increased over that obtainable in exactly the same conditions without the use of aluminium chloride.

It will be found that the light solvent which is distilled over is water-white in colour and comparatively free from objectionable odour.

The aluminium chloride appears to act as a catalyst in addition to its action as a deodorizer and decolourizer. Care must be taken to prevent the aluminium chloride from volatilizing.

It is advisable to "cut" the distillation at the point where the aluminium chloride would begin to volatilize (about 180° C.) and it will be found that the residue left in the "still" at this point, after separation from the aluminium chloride possesses the attributes of a lubricating oil. By further fractional distillation of this residue preferably in vacuo it is possible to obtain different grades of lubricating oil such as light oil, medium oil and heavy oil.

In dealing with crude rubber such as ordinary smoked sheets of commerce, I may distil the rubber as described above in the case of latex after the water has been evaporated, or I may make a plain distillation of the crude rubber and treat this distillate or that obtained from vulcanized rubber in the following manner.

In the treatment of vulcanized rubber, I take preferably waste vulcanized rubber such as old motor tyres and subject these to dry destructive distillation. The rubber in the tyres is distilled and the distillate collected in the condenser. The dry residue consists chiefly of carbon black, and zinc oxide, and may be ground up and used again as a filler in the compounding of rubber.

In carrying out the destructive distillation of the rubber I preferably maintain a high pressure both in the "still" and the condenser so as to obtain the maximum "cracking" effect thereby produced.

I then place the distillate in a "still" and add to it from 5 to 10% of anhydrous aluminium chloride and either subject this to refluxing from 20 to 30 hours, with subsequent fractional distillation, or to a slow distillation, preferably so that not more than 5% of the light fractions are distilled over per hour.

I control the "still" temperatures so that the aluminium chloride is not volatilized and the distillation is "cut" when the oil in the "still" is just below the temperature at which the aluminium chloride would volatilize.

It has been noticed that when the aluminium chloride and the rubber distillate are first heated together in a "still" a violent reaction takes place.

The light solvent which is distilled over is found to be water-white in colour, stable in the presence of heat and hydrochloric acid, and is also found to be a solvent of rubber, wax, and most organic substances. It will readily mix with organic liquids such as turpentine and when a drop is placed upon clean white filter paper it does not leave any mark upon evaporation.

I have found that if the rate of distillation with the aluminium chloride is too rapid, the light fractions distil over in a light yellow condition, but upon redistillation I have been able to obtain a white colour.

The residue which is left in the "still", upon being freed from the aluminium chloride, is found to be a lubricating oil, stable in the presence of air, oxidizing agents and hydrochloric acid. Upon further distillation in vacuo, it may be given any desired degree of viscosity.

It will be obvious that what I term the light fractions may be "cut" at any point in the distillation in order to produce solvents having different flash points and boiling points.

As an example the following figures and description illustrate the process.

Two hundred c. c. of crude distillate obtained from the destructive distillation of old tyres was placed in a distillation flask fitted to a reflux condenser.

To this oil was added 10 grammes anhydrous aluminium chloride.

The distillate was "refluxed" for a period of 12 hours at just above the boiling point of the liquid.

A violent reaction was observed just before boiling point was reached and the liquid became darker and turgid.

After 12 hours the liquid was decanted from the distillation flask leaving the aluminium chloride which appeared to be covered with a tarry residue.

The liquid was well washed with water and dilute caustic soda solution, and the water separated by standing.

The liquid was then subjected to fractional distillation and the following table shows the temperatures and fractions distilled.

| Temperatures in °C. | Quantity in cubic centimeters | Colour |
|---|---|---|
| 88 to 160 | 2.5 | Water-white. |
| 160 to 170 | 4.5 | Do. |
| 170 to 180 | 10.5 | Do. |
| 180 to 190 | 11.5 | Do. |
| 190 to 200 | 10.0 | White. |
| 200 to 210 | 7.5 | Pale yellow. |
| 210 to 275 | 20.0 | Do. |
| Total | 66.5 | |

The fractions as recovered were found to be slightly acid and were washed with caustic soda solution. One fraction which was not so washed did not maintain its water-white colour on standing but became yellow.

The fractions distilling over between 170° C. and 200° C. were mixed and the flash point (closed) determined on a Pensky-Martins flash tester was 84° F.

On completion of the above mentioned fractional distillation the residue was subjected to further distillation in a vacuum during which the temperature did not rise above 150° C.

About 20 c. c. of white solvent passed over into the condenser and the final residue resembled in appearance and behaviour a good quality lubricating oil.

Its flash point (open) was 345° F. and fire point 365° F.

Its viscosity was excellent both at high temperature and low.

It was stable in the presence of acids and strong oxidizing agents.

It possessed the property of acting as a softener of rubber during mastication.

I claim:

1. A method of preparing solvents from vulcanized rubber which consists in subjecting the rubber to dry destructive distillation, adding aluminum chloride to the distillate, fractionally distilling the distillate at about atmospheric pressure and removing the light fractions which are stable to oxidizing agents as rapidly as they are formed, arresting the distillation at about 180° C. where the aluminum chloride is about to volatilize and separating the residue from the aluminum chloride.

2. A method of preparing solvents from rubber which consists in adding up to 10% of anhydrous aluminum chloride to the rubber, distilling the mix under at least atmospheric pressure with a reflux condenser and arresting the distillation at about 180° C. where the aluminum chloride is about to volatilize.

3. A method of preparing solvents from rubber which consists in adding 5% to 10% of aluminum chloride to the rubber, distilling the mix under at least atmospheric pressure and removing the light fractions which are stable to oxidizing agents as rapidly as they are formed, the rate of distillation being adjusted so that about 3% of the total weight of rubber passes over as a distillate per hour, arresting distillation at about 180° C. where the aluminum chloride is about to volatilize and separating the residue from the aluminum chloride.

FRANCIS NORMAN PICKETT.